BEST AVAILABLE COPY

T856043

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 26, 1968

856 O.G. 1020

630,114

PROCESS FOR REMOVING DIVINYLACETYLENE FROM AMIDE SOLVENT

Donald Nellis Robinson, Louisville, Ky., assignor to E. I. du Pont de Nemours and Company, Wilmington, Del., a corporation of Delaware

Filed Apr. 11, 1967. Published Nov. 26, 1968

Class 260—678

1 Sheet Drawing. 9 Pages Specification

The process of manufacturing monovinylacetylene from acetylene wherein (1) divinyl acetylene and acetylenic polymers in an amide solvent are mixed with (2) aromatic hydrocarbon solvent having a specific gravity below about 0.97 and water, said divinylacetylene and acetylenic polymers dissolving in the aromatic hydrocarbon phase which phase is then separated from the aqueous phase, the improvement wherein the pH of the resulting mixture of said (1) and (2) is maintained at a pH between about 7.0 and about 9.5, by adding, as needed, an amine and, optionally, an inert soluble basic ionizable salt, followed by separating the aromatic hydrocarbon phase from the aqueous amide solvent phase. A preferred process is one wherein the weight ratio of said amine to said salt is within the range of about 1:0.05 to about 1:0.15, said hydrocarbon solvent is toluene, said amine is diethanol amine, said salt is trisodium phosphate and said amide is dimethylformamide.

Additional amines which will perform in equivalent manner to the preferred diethanol amine include triethanol amine and tetraethylene pentamine. Although trisodium phosphate is the preferred salt, other salts which can be utilized include sodium benzoate, tetraethyl ammonium bromide, sodium phthalate and sodium terephthalate. Other hydrocarbon solvents which can be utilized include xylene and ethylbenzene. Additional amide solvents include those in U.S. Patent 3,147,312.

This process significantly prevents the formation of an emulsion which heretofore caused large amounts of divinylacetylene and polymer, with water and amide solvent, to be carried to the amide solvent recovery column.

BEST AVAILABLE COPY
T856043
U.S. Pat. Office
CLASS 260 SUBCLASS 678
APPROVED BY DRAFTSMAN
630144
GROUP 1
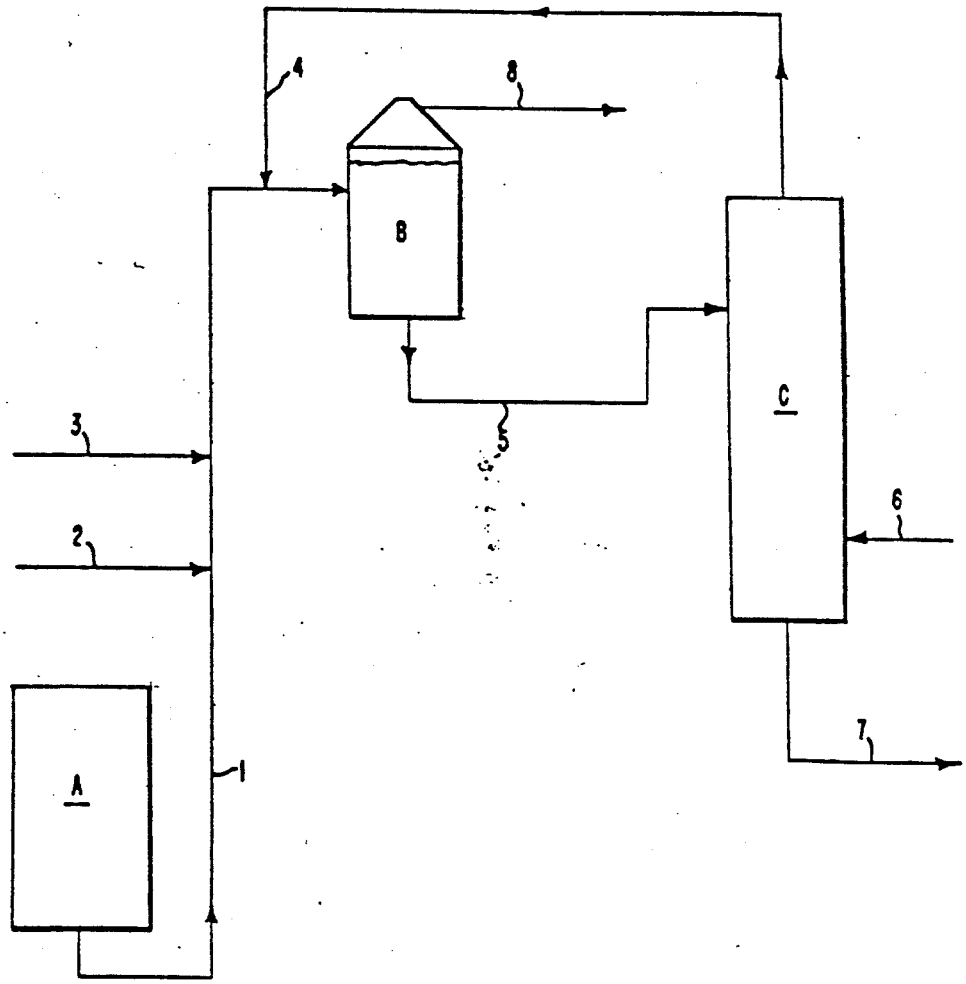
INVENTOR
DONALD N. ROBINSON